US010855448B2

(12) United States Patent
McMurdie et al.

(10) Patent No.: US 10,855,448 B2
(45) Date of Patent: Dec. 1, 2020

(54) APPARATUS AND METHOD FOR USING BLOCKCHAINS TO ESTABLISH TRUST BETWEEN NODES IN INDUSTRIAL CONTROL SYSTEMS OR OTHER SYSTEMS

(71) Applicant: Honeywell International Inc., Morris Plains, NJ (US)

(72) Inventors: Kevin McMurdie, Surprise, AZ (US); Ganesh P. Gadhe, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 317 days.

(21) Appl. No.: 15/970,418

(22) Filed: May 3, 2018

(65) Prior Publication Data
US 2019/0342077 A1    Nov. 7, 2019

(51) Int. Cl.
*H04L 9/06* (2006.01)
*H04L 9/30* (2006.01)
*H04L 9/32* (2006.01)
*H04L 9/08* (2006.01)

(52) U.S. Cl.
CPC .......... *H04L 9/0643* (2013.01); *H04L 9/0825* (2013.01); *H04L 9/30* (2013.01); *H04L 9/3263* (2013.01); *H04L 2209/38* (2013.01)

(58) Field of Classification Search
CPC ....... H04L 9/0643; H04L 9/0825; H04L 9/30; H04L 9/3263; H04L 2209/38
See application file for complete search history.

(56) References Cited

U.S. PATENT DOCUMENTS

| 10,476,847 | B1* | 11/2019 | Smith ................ H04L 63/0407 |
| 2016/0234241 | A1 | 8/2016 | Talamanchi et al. |
| 2017/0206604 | A1* | 7/2017 | Al-Masoud ............ G06Q 40/06 |
| 2018/0097783 | A1* | 4/2018 | Haldenby ............. H04L 9/0861 |
| 2018/0198628 | A1 | 7/2018 | Hojsik et al. |
| 2019/0036682 | A1* | 1/2019 | Qiu ....................... H04L 9/3265 |
| 2019/0109713 | A1* | 4/2019 | Clark ................... G06F 16/182 |
| 2019/0109848 | A1* | 4/2019 | Clark ...................... H04W 4/70 |
| 2019/0122183 | A1* | 4/2019 | Kalyani ................ H04L 9/0861 |
| 2019/0163896 | A1* | 5/2019 | Balaraman ............. G06F 16/27 |

(Continued)

OTHER PUBLICATIONS

Rosic, "What is Ethereum? A Step-by-Step Beginners Guide [Ultimate Guide]," blockgeeks.com, Dec. 2017, 19 pages.

(Continued)

*Primary Examiner* — Joseph P Hirl
*Assistant Examiner* — Stephen T Gundry

(57) ABSTRACT

An apparatus includes at least one processor configured to determine whether a blockchain identifies a valid smart contract indicating that communication with a specified node is permitted. In response to determining that the blockchain does identify the valid smart contract, the at least one processor is configured to establish a secure communication session with the specified node. In response to determining that the blockchain does not identify the valid smart contract, the at least one processor is configured to generate a new smart contract associated with the specified node, establish the secure communication session with the specified node in response to user approval of the new smart contract, and not establish the secure communication session with the specified node in response to user rejection of the new smart contract.

14 Claims, 6 Drawing Sheets

(56) References Cited

U.S. PATENT DOCUMENTS

| | | | |
|---|---|---|---|
| 2019/0279210 A1* | 9/2019 | Pen | H04L 9/0637 |
| 2019/0305932 A1* | 10/2019 | Townsend | H04L 9/0637 |
| 2019/0318338 A1* | 10/2019 | Verma | H04L 9/0637 |
| 2019/0319808 A1* | 10/2019 | Fallah | H04L 9/30 |
| 2019/0327080 A1* | 10/2019 | Liu | H04L 9/3247 |
| 2019/0333054 A1* | 10/2019 | Cona | H04W 12/00518 |
| 2019/0334904 A1* | 10/2019 | Lelcuk | H04L 63/20 |
| 2019/0340269 A1* | 11/2019 | Biernat | G06F 16/248 |
| 2019/0342084 A1* | 11/2019 | Mehedy | H04L 9/0825 |
| 2019/0349426 A1* | 11/2019 | Smith | H04L 67/104 |
| 2019/0386969 A1* | 12/2019 | Verzun | H04L 63/102 |
| 2020/0021446 A1* | 1/2020 | Roennow | H04L 63/1458 |
| 2020/0101367 A1* | 4/2020 | Tran | G06F 3/011 |
| 2020/0137082 A1* | 4/2020 | Jimenez-Delgado | H04L 9/0643 |
| 2020/0145216 A1* | 5/2020 | Clark | H04L 9/3213 |

OTHER PUBLICATIONS

"SSL Certificate Validation / What is a Certification Authority," web.archive.org, Sep. 2017, 13 pages.

Hojsik et al., "Automated Certificate Enrollment for Devices in Industrial Control Systems or Other Systems," U.S. Appl. No. 15/891,095, filed Feb. 7, 2018, 42 pages.

\* cited by examiner

APPARATUS AND METHOD FOR USING BLOCKCHAINS TO ESTABLISH TRUST BETWEEN NODES IN INDUSTRIAL CONTROL SYSTEMS OR OTHER SYSTEMS

TECHNICAL FIELD

This disclosure relates generally to computing and network security. More specifically, this disclosure relates to an apparatus and method for using blockchains to establish trust between nodes in industrial control systems or other systems.

BACKGROUND

Many conventional systems use public-key infrastructures (PKIs) in order to authenticate nodes in the systems and to protect data being transported in the systems. A node in these types of systems is typically associated with a public-private cryptographic key pair. The private key typically remains known only to that specific node, while the public key can be provided to other nodes. In theory, data that is encrypted using the public key can only be decrypted using the private key (and vice versa). As a result, the cryptographic keys can be used for both authentication and encryption. For authentication, a specific node could encrypt data using its private key, and other nodes could decrypt the data using the associated public key in order to verify that the specific node possesses the private key and thus verify the identity of the specific node. For encryption, other nodes could encrypt data using a specific node's public key, and the data can be securely transported since the data can only be decrypted by the specific node using its private key.

In a public-key infrastructure, a digital certificate is typically used to indicate that a specific node is the true owner of a specific public cryptographic key. In such an infrastructure, various components of the infrastructure are typically used to create, distribute, store, use, and revoke digital certificates in order to properly manage the use of public keys. In some cases, digital certificates are issued by certificate authorities (CAs), which ideally act as trusted parties that only issue digital certificates when approved. In other cases, digital certificates are "self-signed," meaning they are signed and issued by the nodes associated with the public keys.

Industrial control systems (ICSs) are routinely used to monitor and control complex industrial processes. An increasing level of security defense mechanisms have been needed as these systems evolved from closed proprietary systems in the early 1990s to convenient, connected, and open systems over the years. Open systems were adopted in a trend shift for increased convenience, improved connectivity, and improved productivity. However, these systems became more vulnerable to exploits due to the widespread knowledge about open system vulnerabilities. Among other things, industrial facilities have used public-key infrastructures along with digital certificates in order to help provide security in their industrial control systems.

SUMMARY

This disclosure provides an apparatus and method for using blockchains to establish trust between nodes in industrial control systems or other systems.

In a first embodiment, an apparatus includes at least one processor configured to determine whether a blockchain identifies a valid smart contract indicating that communication with a specified node is permitted. In response to determining that the blockchain does identify the valid smart contract, the at least one processor is configured to establish a secure communication session with the specified node. In response to determining that the blockchain does not identify the valid smart contract, the at least one processor is configured to generate a new smart contract associated with the specified node, establish the secure communication session with the specified node in response to user approval of the new smart contract, and not establish the secure communication session with the specified node in response to user rejection of the new smart contract.

In a second embodiment, a non-transitory computer readable medium contains instructions that when executed cause at least one processor to determine whether a blockchain identifies a valid smart contract indicating that communication with a specified node is permitted. The medium also contains instructions that when executed cause the at least one processor, in response to determining that the blockchain does identify the valid smart contract, to establish a secure communication session with the specified node. The medium further contains instructions that when executed cause the at least one processor, in response to determining that the blockchain does not identify the valid smart contract, to generate a new smart contract associated with the specified node, establish the secure communication session with the specified node in response to user approval of the new smart contract, and not establish the secure communication session with the specified node in response to user rejection of the new smart contract.

In a third embodiment, a method includes determining whether a blockchain identifies a valid smart contract indicating that communication with a specified node is permitted. The method also includes, in response to determining that the blockchain does identify the valid smart contract, establishing a secure communication session with the specified node. The method further includes, in response to determining that the blockchain does not identify the valid smart contract, generating a new smart contract associated with the specified node, establishing the secure communication session with the specified node in response to user approval of the new smart contract, and not establishing the secure communication session with the specified node in response to user rejection of the new smart contract.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
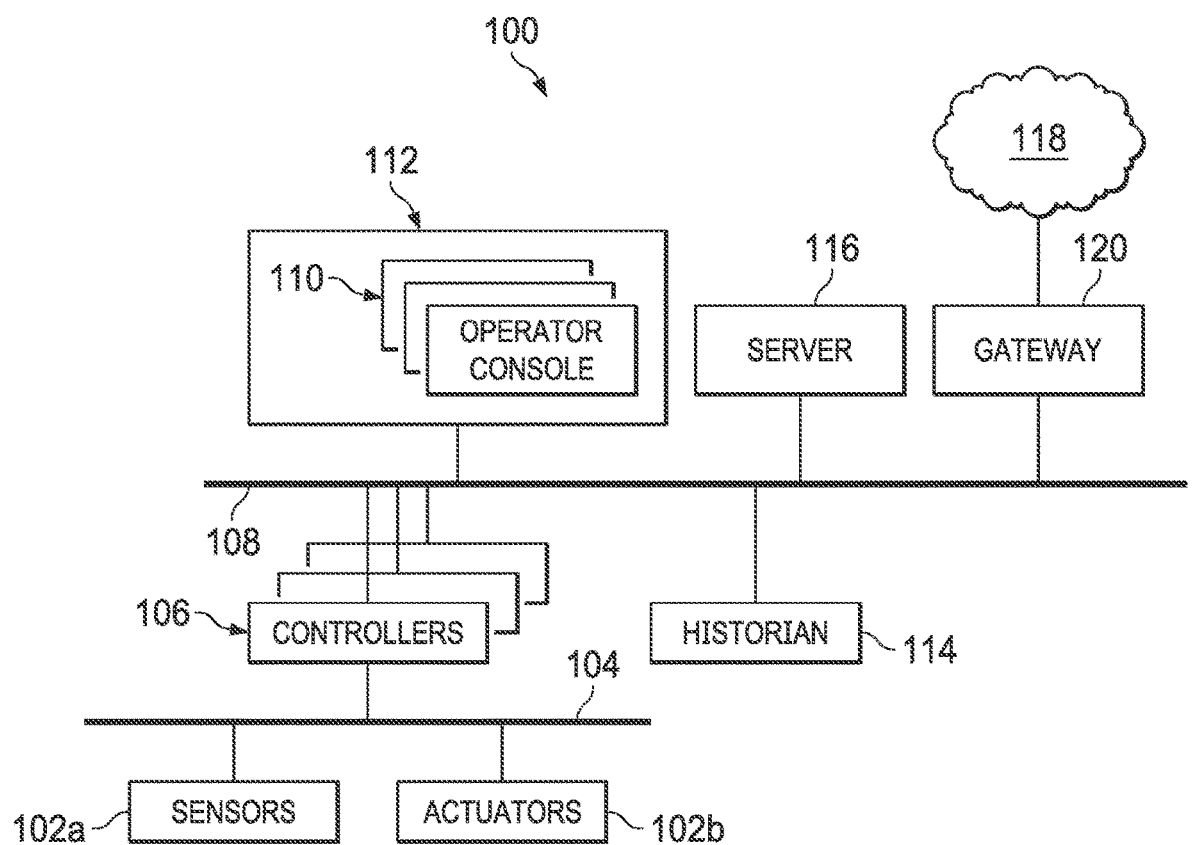
FIG. 1 illustrates an example industrial process control and automation system according to this disclosure.

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

As noted above, various systems such as communication systems, industrial control systems, and other computing or networking systems use public-key infrastructures (PKIs) in order to authenticate nodes in the systems and to protect data being transported in the systems. In a public-key infrastructure, digital certificates can be used to indicate that specific nodes are the true owners of specific public cryptographic keys. Some digital certificates are issued by certificate authorities (CAs), which are supposed to act as trusted parties that only issue digital certificates when approved. However, this is not always the case. For example, in 2013 and again in 2015, GOOGLE announced that digital certificates for several of its domains had been generated by a certificate authority without the permission or knowledge of GOOGLE. In these types of cases, rogue certificates could allow malicious parties to spoof the trust relationship that certificate authority-based PKI provides. These two incidents are not isolated examples, and certificate authorities and their intermediaries continue to be high-value targets to hackers and other malicious actors in the cyber domain.

Other digital certificates are issued by nodes themselves and are referred to as "self-signed" digital certificates. However, the use of self-signed digital certificates undermines the trust that would ordinarily be created if the digital certificates were signed by a trusted certificate authority. This is because self-signed digital certificates are still subject to impersonation by malicious actors since there is no certificate authority that can be consulted to verify their authenticity. Thus, a self-signed digital certificate cannot be used to guarantee the identity of a node providing the self-signed digital certificate. Moreover, it is typically difficult or impossible to revoke self-signed digital certificates after distribution. Further, self-signed digital certificates are typically more difficult to implement. In addition, older self-signed digital certificates are typically vulnerable to newer cyber exploits, making them less secure.

This disclosure provides techniques for using blockchains to establish trust between nodes in industrial control systems or other systems. As described in more detail below, when a first node wishes to communicate with a second node, the second node can collect information about the first node and generate a smart contract. The second node also requests that an authorized user approve the smart contract, which allows a human operator to control whether communication with the first node is allowable. If approved, the smart contract is inserted into various local copies of a blockchain, and the first and second nodes can exchange additional information and establish a secure communication session between the nodes. If the first node subsequently attempts to communicate with the second node again or with another node, the second node or other node can access a local copy of the blockchain and determine that communications with the first node are allowed based on the smart contract contained in the blockchain. Approval from an authorized user would not be required for the subsequent communications to occur. Also, applications or other nodes could use the blockchain to determine whether the first node is a trusted node, and those applications or other nodes could communicate with the first node if previous trust has been established.

Depending on the implementation, these approaches may or may not completely eliminate the use of a public-key infrastructure. However, at a minimum, these approaches can reduce or eliminate the use of self-signed digital certificates, thereby mitigating the various problems described above. Also, these approaches may require that an authorized human approval be obtained before a smart contract is inserted into a blockchain. As a result, these approaches can help to reduce or eliminate the likelihood that an unauthorized user with a rogue certificate could illicitly gain access to one or more nodes. Other advantages or benefits could also be achieved depending on the implementation.

FIG. 1 illustrates an example industrial process control and automation system 100 according to this disclosure. As shown in FIG. 1, the system 100 includes various components that facilitate production or processing of at least one product or other material. For instance, the system 100 can be used to facilitate control over components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials in some manner.

In FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as flow, pressure, or temperature. Also, the actuators 102b could alter a wide variety of characteristics in the process system, such as valve openings. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent at least one Ethernet network (such as one supporting a FOUNDATION FIELDBUS protocol), electrical signal network (such as a HART network), pneumatic control signal network, or any other or additional type(s) of network(s).

The system 100 also includes various controllers 106. The controllers 106 can be used in the system 100 to perform various functions in order to control one or more industrial processes. For example, a first set of controllers 106 may use measurements from one or more sensors 102a to control the operation of one or more actuators 102b. A second set of controllers 106 could be used to optimize the control logic or other operations performed by the first set of controllers. A third set of controllers 106 could be used to perform additional functions. The controllers 106 could therefore support a combination of approaches, such as regulatory control, advanced regulatory control, supervisory control, and advanced process control.

Each controller 106 includes any suitable structure for controlling one or more aspects of an industrial process. At least some of the controllers 106 could, for example, represent proportional-integral-derivative (PID) controllers or multivariable controllers, such as controllers implementing model predictive control (MPC) or other advanced predictive control (APC). As a particular example, each controller 106 could represent a computing device running a real-time operating system, a WINDOWS operating system, or other operating system.

At least one network 108 couples the controllers 106 and other devices in the system 100. The network 108 facilitates the transport of information between components. The network 108 could represent any suitable network or combination of networks. As a particular example, the network 108 could represent at least one Ethernet network.

Operator access to and interaction with the controllers 106 and other components of the system 100 can occur via various operator consoles 110. Each operator console 110 could be used to provide information to an operator and receive information from an operator. For example, each operator console 110 could provide information identifying a current state of an industrial process to the operator, such as values of various process variables and warnings, alarms, or other states associated with the industrial process. Each operator console 110 could also receive information affecting how the industrial process is controlled, such as by receiving setpoints or control modes for process variables controlled by the controllers 106 or other information that alters or affects how the controllers 106 control the industrial process. Each operator console 110 includes any suitable structure for displaying information to and interacting with an operator. For example, each operator console 110 could represent a computing device running a WINDOWS operating system or other operating system.

Multiple operator consoles 110 can be grouped together and used in one or more control rooms 112. Each control room 112 could include any number of operator consoles 110 in any suitable arrangement. In some embodiments, multiple control rooms 112 can be used to control an industrial plant, such as when each control room 112 contains operator consoles 110 used to manage a discrete part of the industrial plant.

The control and automation system 100 here may optionally include at least one historian 114 and/or one or more servers 116. The historian 114 represents a component that stores various information about the system 100. The historian 114 could, for instance, store information that is generated by the various controllers 106 during the control of one or more industrial processes. The historian 114 includes any suitable structure for storing and facilitating retrieval of information. Although shown as a single component here, the historian 114 could be located elsewhere in the system 100, or multiple historians could be distributed in different locations in the system 100.

Each server 116 denotes a computing device that executes applications for users of the operator consoles 110 or other applications. The applications could be used to support various functions for the operator consoles 110, the controllers 106, or other components of the system 100. For example, the server 116 could be used to execute a RISK MANAGER industrial cybersecurity application suite from HONEYWELL INTERNATIONAL INC., which could collect data from other components of the system 100 and analyze the data to identify cybersecurity risks and vulnerabilities. The server 116 could execute any other suitable cybersecurity applications or other applications. Each server 116 could represent a computing device running a WINDOWS operating system or other operating system. Note that while shown as being local within the control and automation system 100, the functionality of the server 116 could be remote from the control and automation system 100. For instance, the functionality of the server 116 could be implemented in a computing cloud 118 or a remote server communicatively coupled to the control and automation system 100 via a gateway 120.

As described in more detail below, one or more blockchains can be used to establish trust between various devices in the system 100. For example, a first node in the system 100 may attempt to establish a communication session with a second node in the system 100, where each node represents a controller 106, operator console 110, historian 114, server 116, or other component. The second node could access a blockchain or request that another component access a blockchain in order to determine whether a smart contract allowing communication with the first node was previously approved and inserted into the blockchain. If so, the second node communicates with the first node, and the nodes can exchange information in any suitable manner during the communication session. If not, the second node can collect information from the first node, generate a smart contract, and request authorized user approval of the smart contract. Approval of the smart contract causes the smart contract to be inserted into the blockchain, and the nodes can exchange information in any suitable manner during the communication session. Rejection of the smart contract (including explicit rejections and failures to approve) prevents or restricts the nodes from communicating further, and the rejection can be recorded in the blockchain for later use or analysis. Also, applications or other nodes could use the blockchain to determine whether certain nodes are trusted and communicate with those nodes if trust was previously established.

The use of blockchain technology to leverage smart contracts in this manner can supplement or replace the use of public-key infrastructures while still providing authentication and validation mechanisms and enforcement of those mechanisms. For example, a blockchain typically acts as an immutable ledger of transactions, which include smart contract execution. The immutability of the blockchain ledger and the capabilities of smart contracts provide a new mechanism for establishing trust in networks and devices. Additional details regarding this functionality are provided below.

Although FIG. 1 illustrates one example of an industrial process control and automation system 100, various changes may be made to FIG. 1. For example, the system 100 could include any number of sensors, actuators, controllers, networks, operator consoles, control rooms, historians, servers, and other components. Also, the makeup and arrangement of the system 100 in FIG. 1 are for illustration only. Components could be added, omitted, combined, further subdivided, or placed in any other suitable configuration according to particular needs. As a particular example, the historian 114 or server 116 may be implemented in the computing cloud 118. Further, particular functions have been described as being performed by particular components of the system 100. This is for illustration only. In general, control and automation systems are highly configurable and can be configured in any suitable manner according to particular needs. In addition, while FIG. 1 illustrates one example operational environment where blockchains can be used to establish trust between nodes, this functionality can be used in any other suitable system (and that system need not be an industrial control or automation system).

Figure 2:
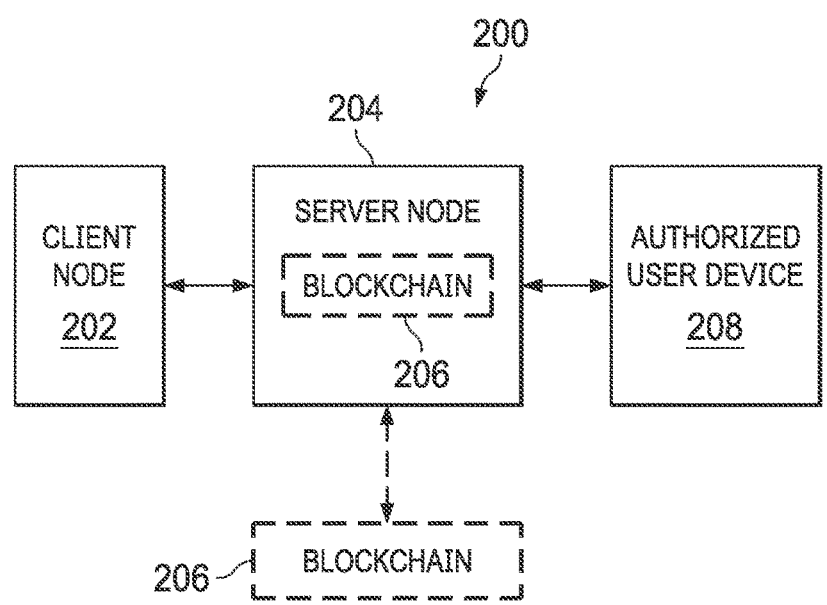
FIG. 2 illustrates an example functional architecture for using blockchains to establish trust between nodes in industrial control systems or other systems according to this disclosure.

FIG. 2 illustrates an example functional architecture 200 for using blockchains to establish trust between nodes in industrial control systems or other systems according to this disclosure. For ease of explanation, the functional architecture 200 of FIG. 2 may be described as being implemented using different components in the system 100 of FIG. 1. However, the functional architecture 200 could be implemented using nodes in any suitable system, and those nodes do not need to perform industrial control or automation functions.

As shown in FIG. 2, the functional architecture 200 generally includes at least one client node 202 and at least one server node 204. Each client node 202 generally represents a device that attempts to initiate a communication session. Each server node 204 generally represents a device that receives a request for a communication session from a client node. It should be noted that these designations (client and server) are used here as a matter of convenience and do not limit the activities that can be performed by these nodes. A device could function as both a server to one or more clients and a client to one or more servers. "Client" and "server" here therefore merely indicate whether a device is initiating a request for a communication session or receiving a request for a communication session. Each node 202 and 204 represents any suitable computing, networking, communication, or other device configured to communicate with other devices. Each node 202 and 204 could, for example, represent one of the components in the process control and automation system 100 of FIG. 1.

When the client node 202 attempts to initiate a communication session with the server node 204, the server node 204 accesses at least one blockchain 206. The server node 204 could have a copy of a blockchain 206 stored locally at the server node 204, or a blockchain 206 could be located remote from (but still be accessible to) the server node 204. If the server node 204 contains a local copy of the blockchain 206, the server node 204 could be referred to as a "host" or "host node." Each host in a system would typically include or have access to its own local copy of a blockchain 206. The server node 204 uses the blockchain 206 to determine whether communication with the client node 202 was previously authorized. If so, the server node 204 helps to establish the communication session with the client node 202, and the nodes 202 and 204 can exchange data. Alternatively, the server node 204 could query another device that has access to the blockchain 206 and receive an indication from the other device whether communication with the client node 202 was previously authorized.

If the blockchain 206 does not indicate that communication between the server node 204 and the client node 202 was previously authorized, the server node 204 generates a smart contract and sends a request for approval to at least one authorized user device 208. Each authorized user device 208 generally represents a device used by an authorized user who can approve or reject the smart contract. For example, an authorized user device 208 could represent an operator console 110 being used by a user who is permitted to approve or reject smart contracts. An authorized user device 208 could represent any other suitable device that is able to receive information about smart contracts and to approve or reject the smart contracts. Example authorized user devices 208 could include desktop computers, laptop computers, tablet computers, smartphones, or smart watches.

If the smart contract is approved by an authorized user device 208, the smart contract or data associated with the smart contract is added to the server node's local copy of the blockchain 206 or to the blockchain 206 otherwise used by the server node 204. Also, updates can be sent to other host nodes that have local copies of the blockchain 206 so that those host nodes can update their local copies of the blockchain 206. Each blockchain 206 can secure data by linking a new block in the blockchain 206 to a previous block in the blockchain 206. Thus, the approved smart contract can be inserted into each copy of the blockchain 206, the blockchain 206 acts as a decentralized and immutable ledger for the smart contract, and the smart contract cannot be altered or compromised without a discrepancy appearing in at least one copy of the blockchain 206. The smart contract is therefore backed by blockchain technology to provide an immutable record and a mechanism to enforce adherence to the communication decision contained in the smart contract. If the smart contract is rejected by an authorized user device 208, an indication of this rejection can also be stored in the blockchain 206, which may allow the server node 204 or other nodes to ignore subsequent requests from the client node 202 or for rejected requests to be analyzed later. If a previously-approved smart contract is revoked at a later time, an indication of this revocation can further be stored in the blockchain 206, which may allow the server node 204 or other nodes to block subsequent requests from the client node 202. It is also possible for applications (such as those executed on the server node 204) or other nodes to use the blockchain 206 in order to determine whether the client node 202 is a trusted node, and if so communications with the client node 202 could then be initiated.

Each smart contract generated by the server node 204 could include any suitable contents. For example, when the client node 202 requests a communication session and the server node 204 determines that no smart contract was previously approved for the client node 202, the server node 204 could request and the client node 202 could provide various identifying information about the client node 202. As particular examples, the identifying information could include the client node's hostname, Internet Protocol (IP) address, Medium Access Control (MAC) address, serial number or service tag number, motherboard serial number, time alive value, or arbitrary information. The identifying information could also include the client node's public cryptographic key, which is associated with a private cryptographic key held by the client node 202. The server node 204 could include one, some, or all of this information in a smart contract. The smart contract could optionally identify other parameters, such as parameters identifying the type of communication session being requested by the client node 202. After approval, the smart contract can be used to execute actions or enforce policies in order to manage communications between the nodes 202 and 204 based on this information.

The inclusion of the client node's public key in the blockchain 206 allows other nodes to obtain the client node's public key from the blockchain 206. The other nodes could then use that public key when attempting to communicate with the client node 202. This helps to verify whether a device presenting itself as the client node 202 can actually communicate using the public key from the blockchain 206. In effect, the blockchain 206 can be used instead of a CA-issued digital certificate or a self-signed digital certificate.

As a specific example of this functionality, the RISK MANAGER application suite generally operates by collecting cybersecurity-related data from agents executing on devices being monitored and using an analysis application to analyze the data and identify cybersecurity risks and vulnerabilities. However, some devices are not able to execute the agents or provide data to the analysis application in the expected manner, such as when devices executing a WINDOWS XP operating system cannot join a network domain in order to provide data to the analysis application. A possible work-around in this situation is to use a digital certificate for each device that cannot join a domain, where the digital certificate is used to support secure communications between the device and the analysis application.

An alternative approach would be to treat each device having no or limited ability to join a network domain as a client node 202. Each device could then request a communication session with a server node 204, where the server node 204 is executing the RISK MANAGER analysis application. Each device's communication session could be approved once by an authorized user to insert a smart contract into the blockchain 206, and subsequent communication sessions initiated by each device would be permitted based on the device's associated smart contract in the blockchain 206. This approach therefore avoids the need for the devices or analysis application to rely on third-party certificate authorities for identity verification, which might be difficult or impossible to obtain in some closed systems (such as secure industrial control systems). This approach also avoids the need for the devices or analysis application to use self-signed digital certificates.

Note that any suitable blockchain technologies can be used in the functional architecture 200. In some embodiments, for example, the ETHEREUM blockchain as a service can be used. The ETHEREUM platform supports creating local instances of blockchains with all of the operations necessary to implement the approaches described in this patent document. Moreover, smart contracts on ETHEREUM leverage the SOLIDITY programming language, which could be used to build all smart contracts discussed above since they are supported in the ETHEREUM blockchain environment. Smart contracts can be executed in ETHEREUM virtual machines, which can be sandboxed and designed such that code running within the virtual machines has no access to network, filesystem, or other processes. This property provides an additional layer of protection in some implementations. Of course, other implementations are also possible. For instance, there are a number of blockchain technologies associated with cryptocurrencies that could be used (modified or unmodified) in the functional architecture 200.

Although FIG. 2 illustrates one example of a functional architecture 200 for using blockchains to establish trust between nodes in industrial control systems or other systems, various changes may be made to FIG. 2. For example, the functional architecture 200 could include any number of components functioning as client nodes 202, server nodes 204, and authorized user devices 208. Also, any suitable number of blockchains 206 could be used to store smart contracts associated with the nodes. In addition, the functional division shown in FIG. 2 is for illustration only, and various nodes could be combined or further subdivided if desired. For instance, one or more additional nodes could be provided that maintain the blockchain 206 and inform server nodes 204 whether appropriate smart contracts are already contained in the blockchain 206. As another example, a server node 204 could be used by an authorized user so that approval of a smart contract can be provided directly to the server node 204.

Figure 3:
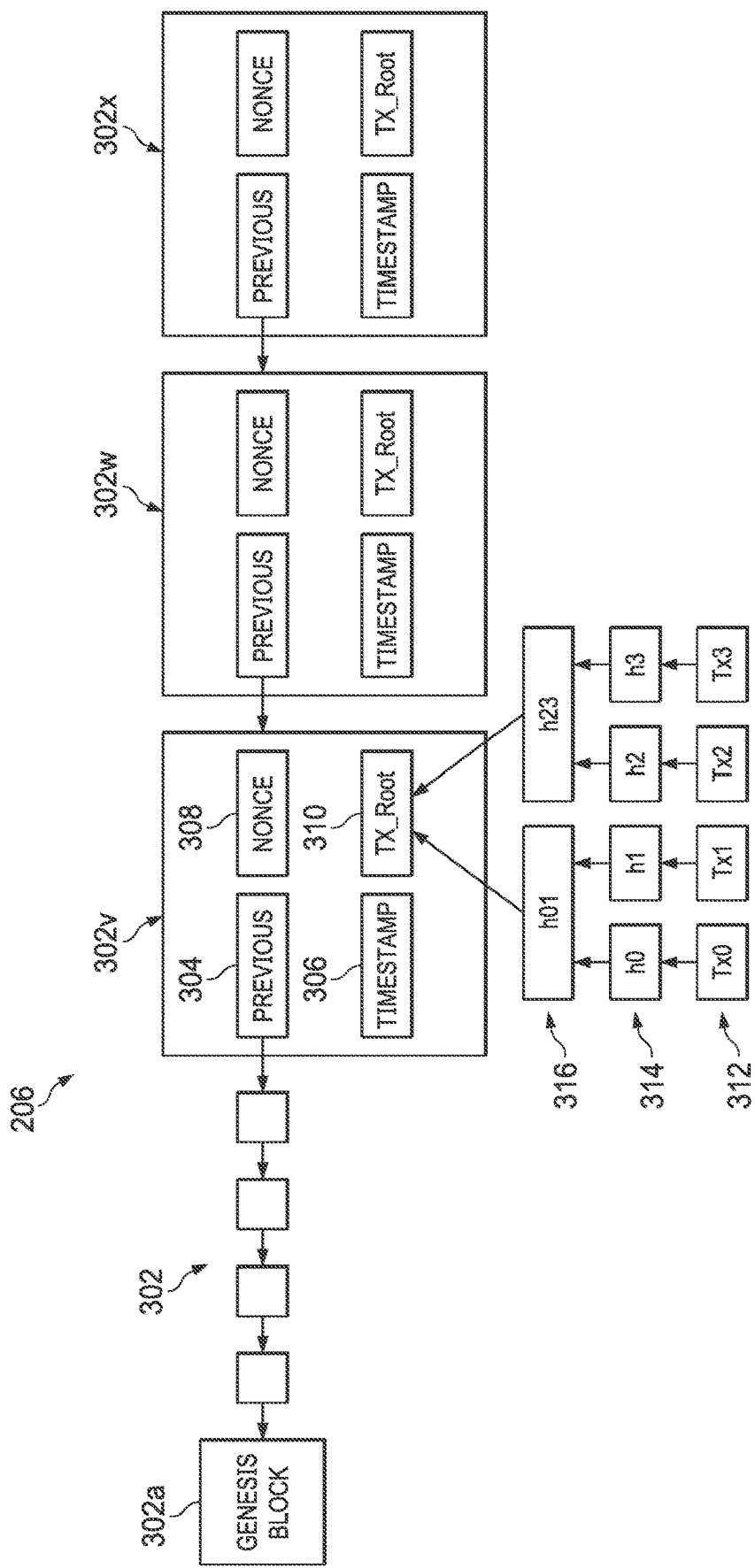
FIG. 3 illustrates an example blockchain used to establish trust between nodes in industrial control systems or other systems according to this disclosure.

FIG. 3 illustrates an example blockchain 206 used to establish trust between nodes in industrial control systems or other systems according to this disclosure. For ease of explanation, the blockchain 206 may be described as being used in the functional architecture 200 of FIG. 2 to establish trust between the nodes 202 and 204 of FIG. 2, which could represent components in the system 100 of FIG. 1. However, the blockchain 206 could be used in any suitable system to establish trust between any suitable nodes.

A blockchain generally refers to a distributed ledger of transactions, where various parties have access to the distributed ledger. The parties can use the distributed ledger to perform various functions, such as publishing new transactions to the blockchain or using the blockchain to obtain or verify information. New transactions are added as blocks to a blockchain using cryptographic operations, and each block in the blockchain (except the first block) is linked to a previous block in the blockchain. Approval by a majority of parties may be needed to add transactions to the blockchain or to verify information.

As shown in FIG. 3, the blockchain 206 includes a sequence of blocks $302a$-$302x$ (which are referred to generally as blocks 302). Each block 302 functions as a record associated with a specific transaction. As described in this patent document, one or more of the blocks 302 include or are associated with one or more smart contracts that define allowable communications between nodes. Except for the first block $302a$ in the blockchain 206, each block 302 includes a previous hash value 304, which represents a cryptographic hash from the previous block 302 in the blockchain 206. Each block 302 also includes a timestamp 306, which identifies the date and time that the associated block 302 was created. Each block 302 further includes a nonce value 308, which represents a value that is added to the block 302 by the device that created the block 302. The nonce value 308 provides proof to other devices that the device that created the block 302 performed certain cryptographic operations in order to generate a valid block 302, where the other devices can easily verify the validity of the block 302 using the nonce value 308.

In addition, each block 302 includes transaction data, which includes a transaction root hash value 310. The transaction root hash value 310 in each block 302 represents a hash value generated by the device that created that block 302 based on transaction information. In this example, the transaction root hash value 310 in each block 302 can be generated by taking data 312 associated with one or more transactions (such as smart contract data) and applying one or more hashing functions using the data 312. This generates one or more hash values 314. Assuming there are multiple hash values 314, one or more additional hashing functions (such as pairwise hashing functions) can be applied to the hash values 314 in order to generate one or more additional hash values 316. An additional hashing function could then be applied to the hash values 316 and other contents of the block 302 in order to generate the root hash value 310. Note that this represents one example of how the transaction root hash value 310 could be generated. In general, the root hash value 310 could be generated in any suitable manner, as long as the root hash value 310 represents a cryptographic hash of most or all of the block 302.

In one aspect of operation, multiple local copies of the blockchain 206 are stored and maintained by multiple host nodes. The blockchain 206 therefore functions as a distributed ledger that can be used by multiple devices to obtain or verify information contained in the blocks 302 of the blockchain 206. Devices can "mine" the blockchain 206 to identify blocks 302 containing desired information, such as one or more blocks 302 containing a smart contract involving two specific nodes. Devices can also generate new transaction data (such as new smart contracts), and cryptographic operations are performed using the transaction data to create and add new blocks 302 to the blockchain 206. Thus, new blocks 302 can be appended to the blockchain 206 at different host nodes as new transactions occur, and these blocks 302 are propagated to other host nodes so that the blockchain 206 can be updated at those nodes. Each new block 302 is linked to a previous block 302 in the blockchain 206 as described above, which helps to prevent someone from illicitly changing data in earlier blocks 302 of the blockchain 206. Approval of a majority of the parties may be required before each new block 302 is added to the blockchain 206 or before mined information is deemed valid.

In the context of establishing trust between nodes for communications, a blockchain 206 can be used to identify approved smart contracts involving various nodes. When a client node 202 attempts to initiate a communication session with a server node 204, the blockchain 206 can be used to determine whether a smart contract has already been approved for the client node 202. If so, at least one block 302 of the blockchain 206 can be identified as containing an appropriate smart contract, and the communication session can proceed. If not, the server node 204 can generate a smart contract and request approval, and one or more new blocks 302 can be added to the blockchain 206 (whether approved or rejected). The blockchain 206 could be used by applications or other nodes in determining whether the client node 202 is trusted, as well.

In this way, the blockchain 206 provides a tamper-evident distributed ledger that can be used by multiple nodes. This helps to establish trust between the various nodes in a system without relying on third-party digital certificates or self-signed digital certificates. The use of blockchain technology also helps to provide data security and data authenticity. In addition, the use of blockchain technology allows for distributed availability of the data.

Although FIG. 3 illustrates one example of a blockchain 206 used to establish trust between nodes in industrial control systems or other systems, various changes may be made to FIG. 3. For example, the blockchain 206 could include any suitable number of blocks 302 and be used to represent any suitable number of transactions. Also, the contents of the blocks 302 could vary as needed or desired. As a particular example, any suitable blockchain technologies could be used here, including those that determine consensus based on non-mining techniques like proof-of-stake techniques. In those types of approaches, content like the nonce values 308 could be omitted from the blocks 302.

Figure 4:
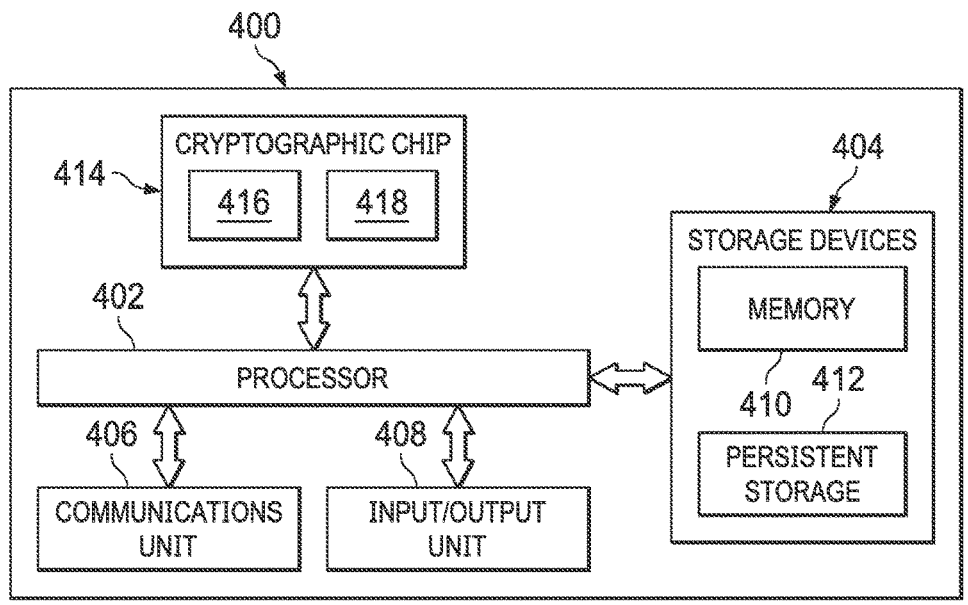
FIG. 4 illustrates an example device for using blockchains to establish trust between nodes in industrial control systems or other systems according to this disclosure.

FIG. 4 illustrates an example device 400 for using blockchains to establish trust between nodes in industrial control systems or other systems according to this disclosure. The device 400 could, for example, represent any of the devices or components in the system 100 of FIG. 1 or the functional architecture 200 of FIG. 2 that can initiate requests for communication sessions, process requests for communication sessions, analyze blockchains, generate smart contracts, or approve smart contracts.

As shown in FIG. 4, the device 400 includes at least one processor 402, at least one storage device 404, at least one communications unit 406, and at least one input/output (I/O) unit 408. Each processor 402 can execute instructions, such as those that may be loaded into a memory 410. Each processor 402 denotes any suitable processing device, such as one or more microprocessors, microcontrollers, digital signal processors, application specific integrated circuits (ASICs), field programmable gate arrays (FPGAs), or discrete circuitry.

The memory 410 and a persistent storage 412 are examples of storage devices 404, which represent any structure(s) capable of storing and facilitating retrieval of information (such as data, program code, and/or other suitable information on a temporary or permanent basis). The memory 410 may represent a random access memory or any other suitable volatile or non-volatile storage device(s). The persistent storage 412 may contain one or more components or devices supporting longer-term storage of data, such as a read only memory, hard drive, Flash memory, or optical disc.

The communications unit 406 supports communications with other systems or devices. For example, the communications unit 406 could include a network interface card or a wireless transceiver facilitating communications over a wired or wireless network. The communications unit 406 may support communications through any suitable physical or wireless communication link(s).

The I/O unit 408 allows for input and output of data. For example, the I/O unit 408 may provide a connection for user input through a keyboard, mouse, keypad, touchscreen, or other suitable input device. The I/O unit 408 may also send output to a display, printer, or other suitable output device.

In addition, the device 400 could optionally include cryptographic circuitry in the form of a cryptographic chip 414, which contains processing circuitry 416 and at least one internal memory 418. The processing circuitry 416 of the cryptographic chip 414 is configured to perform various cryptographic operations, such as key generation or hashing operations. The internal memory 418 of the cryptographic chip 414 is configured to securely store data, such as one or more private or other cryptographic keys. The cryptographic chip 414 can be tamper-resistant or tamper-proof to limit or prevent illicit access to the data stored in the internal memory 418. The cryptographic chip 414 includes any suitable integrated circuitry for performing cryptographic operations, including cryptographic operations that involve data securely stored on the integrated circuitry.

If the device 400 represents a client node 202, the processor 402 can be used to generate a request for a communication session, and the communications unit 406 can transmit the request to a server node 204. The communications unit 406 can also receive a response from the server node 204, such as a request for identifying information or an acceptance or rejection of the communication session request. The processor 402 can then obtain or generate identifying information and provide a suitable response or help to establish the communication session. The cryptographic chip 414 could be used to provide data or perform functions in order to help secure the communication session.

If the device 400 represents a server node 204, the memory 410 or persistent storage 412 could be used to store a blockchain 206. The communications unit 406 can receive a request for a communication session, and the processor 402 can access the blockchain 206 to determine whether communication with the client node 202 has been previously approved (or request that another device provide an indication whether the blockchain 206 indicates that communication with the client node 202 has been previously approved). If so, the processor 402 can generate a response for the client node 202 that is sent via the communications unit 406, and the processor 402 can help to establish the communication session. If not, the processor 402 can interact with the client node 202 via the communications unit 406 to obtain identifying information and generate a smart contract, and a request for approval can be sent to an authorized user device 208. If approved, the processor 402 can generate a new block 302 for the blockchain 206, update its copy of the blockchain 206, and publish the update to other host nodes via the communications unit 406, and the processor 402 can help to establish the communication session. If rejected, the processor 402 can also generate a new block 302 for the blockchain 206, update its copy of the blockchain 206, and publish the update to other host node. The cryptographic chip 414 could be used to provide data or perform functions in order to help secure the communication session or other communications.

If the device 400 represents an authorized user device 208, the processor 402 can receive requests for approval of smart contracts via the communications unit 406 and present notifications to a user, such as on a display device via the I/O unit 408. The processor 402 can also receive input from the user approving or rejecting the smart contracts via the I/O unit 408, and the processor 402 can send suitable responses via the communications unit 406.

Although FIG. 4 illustrates one example of a device 400 for using blockchains to establish trust between nodes in industrial control systems or other systems, various changes may be made to FIG. 4. For example, various components in FIG. 4 could be combined, further subdivided, or omitted and additional components could be added according to particular needs. Also, computing devices can come in a wide variety of configurations, and FIG. 4 does not limit this disclosure to any particular configuration of computing device or even to computing devices.

Figure 5:
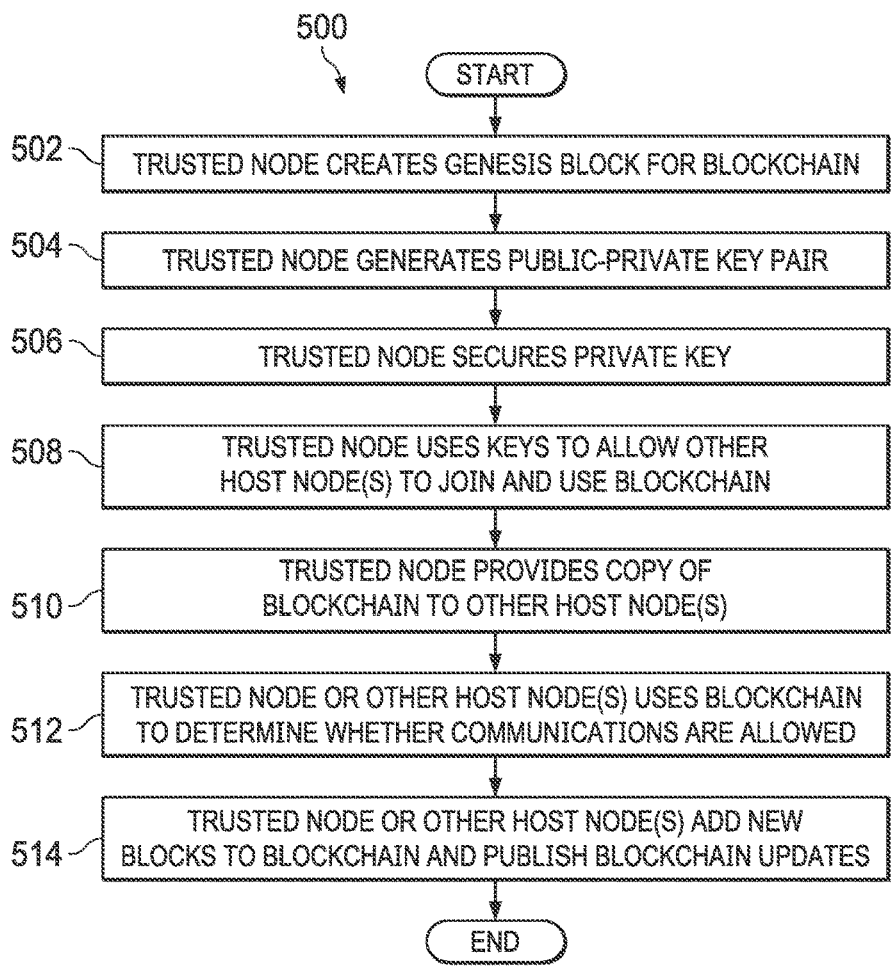
FIG. 5 illustrates an example method for initiating and updating a blockchain used to establish trust between nodes in industrial control systems or other systems according to this disclosure.

FIG. 5 illustrates an example method 500 for initiating and updating a blockchain used to establish trust between nodes in industrial control systems or other systems according to this disclosure. For ease of explanation, the method 500 of FIG. 5 is described as being performed by one or more devices 400 operating as one or more nodes in the functional architecture 200 of FIG. 2. However, the method 500 could be performed by any suitable device(s) in any suitable system.

As shown in FIG. 5, a trusted node generates a genesis block for a blockchain at step 502. This could include, for example, the processor 402 of the trusted node generating an initial block 302a of a blockchain 206. The initial block 302a could contain the same contents as the blocks shown in FIG. 3, except the previous hash value 304 could have a value of zero or other suitable null value. The trusted node used here represents a node that is known to be a valid device in the system. The trusted node could, for example, represent a server node 204 that is known to be valid.

The trusted node generates a public-private cryptographic key pair at step 504. This could include, for example, the processor 402 or the cryptographic chip 414 of the trusted node generating U.S. National Institute of Standards and Technology ("NIST") P-256 cryptographic keys or other suitable cryptographic keys now known or later developed. The cryptographic keys could be generated in any suitable manner, including any techniques now known or later developed. The trusted node secures the private cryptographic key at step 506. This could include, for example, the cryptographic chip 414 of the trusted node storing the private key in the internal memory 418 or the processor 402 of the trusted node securely storing the private key in the persistent storage 412.

The trusted node uses the cryptographic keys to allow one or more other host nodes to join and begin using the blockchain at step 508. This could include, for example, the processor 402 of the trusted node providing the trusted node's public key to each other host node that is attempting to become a host for the blockchain 206. This could also include the processor 402 of the trusted node transmitting and receiving other data that allows the trusted node to establish secure communications with each other host node. In some embodiments, each other host node represents a client node, and the secure communications can be established as described below. The trusted node provides a copy of the blockchain to each other host node at step 510. This could include, for example, the processor 402 of the trusted node providing the trusted node's copy of the blockchain 206 to each of the other host nodes for which secure communication has been established.

The blockchain that is established here could be used in any suitable manner. For example, the trusted node or the other host node(s) could use the blockchain to determine whether communications between nodes are allowed at step 512. This could include, for example, the processor 402 of the trusted node or another host node receiving a request to establish a communication session and examining the blockchain 206 to determine whether the blockchain 206 includes or identifies a previously-approved smart contract that allows the communication. As noted above, it is also possible for the trusted node or another host node to examine the blockchain 206 to determine whether the blockchain 206 allows the communication and to provide an indication of that determination to another device that received the request. Also, the trusted node or the other host node(s) could generate and add new blocks to its own local copy of the blockchain and publish updates of the blockchain to other host nodes at step 514. This could include, for example, the processor 402 of the trusted node or another host node generating new blocks 302 that identify approved and rejected smart contracts. This could also include the processor 402 of the trusted node or another host node publishing the new blocks 302 to all other host nodes for updating of other copies of the blockchain 206.

Although FIG. 5 illustrates one example of a method 500 for initiating and updating a blockchain used to establish trust between nodes in industrial control systems or other systems, various changes may be made to FIG. 5. For example, while shown as a series of steps, various steps in FIG. 5 could overlap, occur in parallel, occur in a different order, or occur any number of times. As a particular example, new blocks could be added to the blockchain after step 502 and before a copy of the blockchain is sent to one or more other host nodes at step 510. As another particular example, one or more other host nodes could be approved and receive a copy of the blockchain after new blocks are added to the blockchain at step 514. In general, the method 500 is meant to illustrate the types of steps that occur when initiating and updating a blockchain but not necessarily the precise ordering of those steps.

Figure 6A:
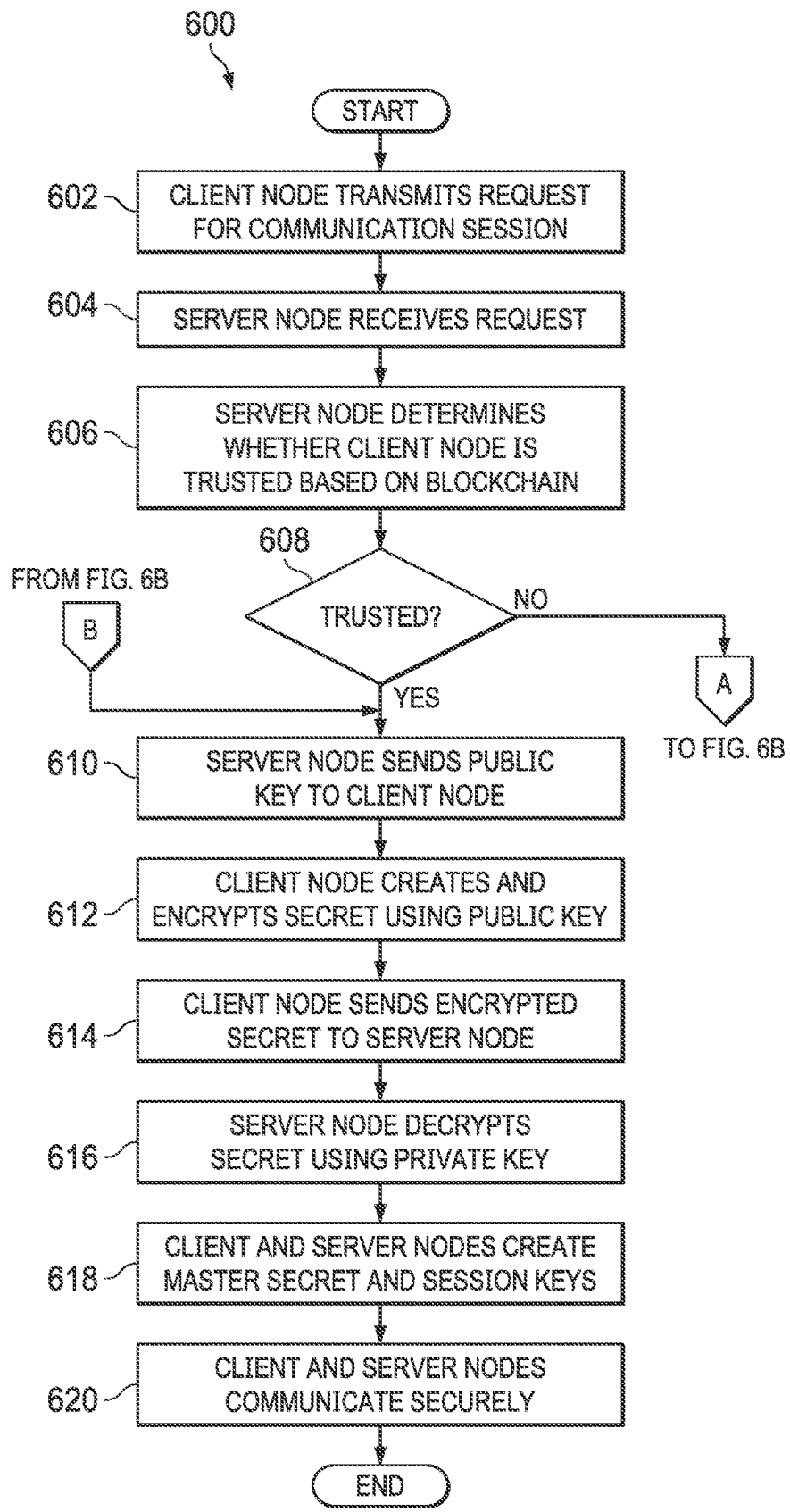
FIGS. 6A and 6B illustrate an example method for using blockchains to establish trust between nodes in industrial control systems or other systems according to this disclosure.
Figure 6B:
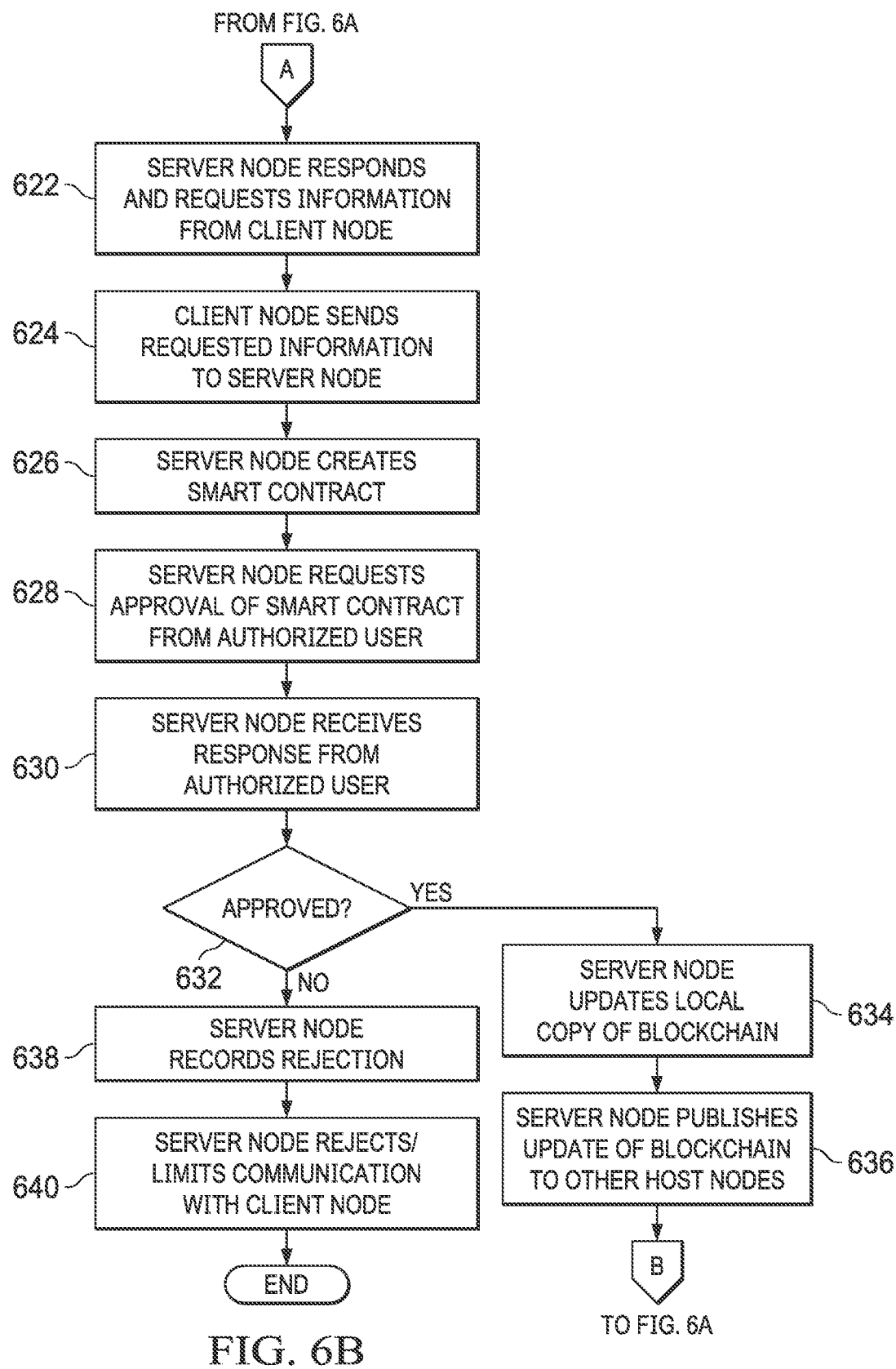

FIGS. 6A and 6B illustrate an example method 600 for using blockchains to establish trust between nodes in industrial control systems or other systems according to this disclosure. Note that there is some overlap between the methods 500 and 600 since (i) the method 600 uses the blockchain established in FIG. 5 and (ii) at least some updates to the blockchain in FIG. 5 could be based on operations that occur in the method 600. Also, the method 600 shown here could be used to allow the original trusted node to provide copies of the blockchain to other host nodes in FIG. 5. For ease of explanation, the method 600 of FIGS. 6A and 6B is described as being performed by various devices 400 operating as nodes in the functional architecture 200 of FIG. 2. However, the method 600 could be performed by any suitable devices in any suitable system.

As shown in FIGS. 6A and 6B, a client node transmits a request for a communication session at step 602. This could include, for example, the processor 402 of the client node 202 generating a request for a communication session and the communications unit 406 transmitting the request. The request could be transmitted to a specific destination or broadcast/multicast to multiple destinations. A server node receives the request at step 604. This could include, for example, the processor 402 of the server node 204 receiving the request via its communications unit 406.

The server node determines whether the client node is trusted based on the contents of a blockchain at step 606. This could include, for example, the processor 402 of the server node 204 accessing a blockchain 206, which could be located in a storage device 404 of the server node 204 or external to the server node 204. This could also include the processor 402 of the server node 204 determining whether the blockchain 206 contains a smart contract indicating that communications with the client node 202 were previously-authorized. The processor 402 of the server node 204 could alternatively request that another device access the blockchain 206, and the other device could provide an indication whether the blockchain 206 contains a suitable smart contract. If there is an appropriate smart contract in the blockchain 206, this could further include the processor 402 of the server node 204 or the other device determining whether the smart contract was revoked in any later blocks 302 of the blockchain 206.

If the client node is trusted at step 608, the client and server nodes can proceed to set up a secure communication session, which in this example occurs using the Transport Layer Security (TLS) protocol. However, there are a number of other protocols and mechanisms for secure communications, and this disclosure is not limited to use of TLS. The server node sends its public key to the client node at step 610. This could include, for example, the processor 402 or cryptographic chip 414 of the server node 204 providing the public key from a private-public key pair to the client node 202. The server node's public key or other data could also be encrypted using the client node's pubic key, which could be obtained from the smart contract in the blockchain 206. The client node creates and encrypts a secret using the server node's public key at step 612. This could include, for example, the processor 402 or cryptographic chip 414 of the client node 202 generating data and encrypting the data using the server node's public key. The client node sends the encrypted secret to the server node at step 614, and the server node decrypts the encrypted secret using its private key at step 616. This could include, for example, the processor 402 or cryptographic chip 414 of the server node 204 decrypting the encrypted data received from the client node 202. The client and server nodes (now both in possession of the shared secret) create a master secret and one or more cryptographic session keys at step 618, and the nodes communicate securely using this information at step 620. This could include, for example, the processor 402 or cryptographic chip 414 of each node 202 and 204 generating the master secret and the session key(s) by performing suitable cryptographic operations. Once the secure communication session is established, the nodes can exchange any suitable data.

If the client node is not trusted at step 608, the server node responds to the client node with a request for information at step 622. This could include, for example, the processor 402 of the server node 204 acknowledging the client node's earlier connection request and requesting identifying information from the client node 202. The client node sends the requested information to the server node at step 624. This could include, for example, the processor 402 of the client node 202 generating a response that identifies the client node's hostname, IP address, MAC address, serial number or service tag number, motherboard serial number, time alive value, or arbitrary information. The response can also include the client node's public key. The server node creates a smart contract at step 626. This could include, for example, the processor 402 of the server node 204 generating a smart contract that identifies the client node 202 and any other desired information (such as the client node's public key and the type of communication session requested).

The server node requests approval of the smart contract from an authorized user at step 628. This could include, for example, the processor 402 of the server node 204 generating a notification and initiating transmission of the notification to at least one authorized user device 208. The notification could indicate that a request for a communication session involving certain nodes has been received, identify one or more of the nodes, and request approval. The server node receives a response from the authorized user at step 630. This could include, for example, the processor 402 of the server node 204 receiving a response from one of the authorized user devices 208 indicating whether the smart contract has been approved.

If the smart contract is approved at step 632, the server node could update its local copy of the blockchain with the approval at step 634 (assuming the server node has a local copy of the blockchain). The server node can also publish the blockchain update to other host nodes at step 636 (assuming the server node creates a blockchain update). This could include, for example, the processor 402 or cryptographic chip 414 of the server node 204 performing cryptographic operations to generate a new block 302 containing the smart contract. This could also include the processor 402 of the server node 204 updating the server node's local copy of the blockchain 206 with the new block 302. This could further include the processor 402 of the server node 204 publishing the new block 302 to one or more other host nodes (if any) so that the host node(s) can update one or more other copies of the blockchain 206. The process can then move to setting up a secure communication session, such as by performing steps 610-620 described above. Steps 634 and 636 could be optional if the server node relies on another device to access and update the blockchain.

If the smart contract is not approved at step 632, the rejection of the smart contract could be recorded at step 638. This could include, for example, the processor 402 or cryptographic chip 414 of the server node 204 performing cryptographic operations to generate a new block 302 identifying the rejection of the smart contract. This could also include the processor 402 of the server node 204 updating the server node's local copy of the blockchain 206 with the new block 302 and publishing the new block 302 to one or more other host nodes (if there are any). Again, step 638 could be optional if the server node relies on another device to access and update the blockchain. The server node rejects or limits further communication with the client node at step 640. This could include, for example, the processor 402 of the server node 204 rejecting the current communication session request from the client node 202. Additional requests from the client node 202 may or may not be ignored depending on the implementation. If desired, one or more additional operations could also occur, such as generating an alert or other notification for supervisory personnel or administrators indicating that an unexpected or undesired request for trust was made in the system and rejected.

Note that while not shown here, the recording of a rejection of a smart contract in a blockchain could be used during later communication attempts from the client node 202. For example, when a server node 204 is determining whether a client node 202 is trusted at step 606, the server node 204 could determine if a smart contract for the same type of communication session involving the same client node 202 was previously rejected based on the contents of the blockchain 206. If so, the server node 204 could skip all intervening steps and move directly to refusing the communication session at step 640.

Although FIGS. 6A and 6B illustrate one example of a method 600 for using blockchains to establish trust between nodes in industrial control systems or other systems, various changes may be made to FIGS. 6A and 6B. For example, while shown as a series of steps, various steps in FIGS. 6A and 6B could overlap, occur in parallel, occur in a different order, or occur any number of times. As a particular example, a node could perform the method 600 multiple times with different client and/or server nodes. In each instance, the node could allow a communication attempt based on a valid smart contract currently in a blockchain, allow a communication attempt based on a new smart contract that is approved, or reject a communication attempt based on a new smart contract that is rejected (and the same blockchain or different blockchains could be used in different instances).

Figure 7:
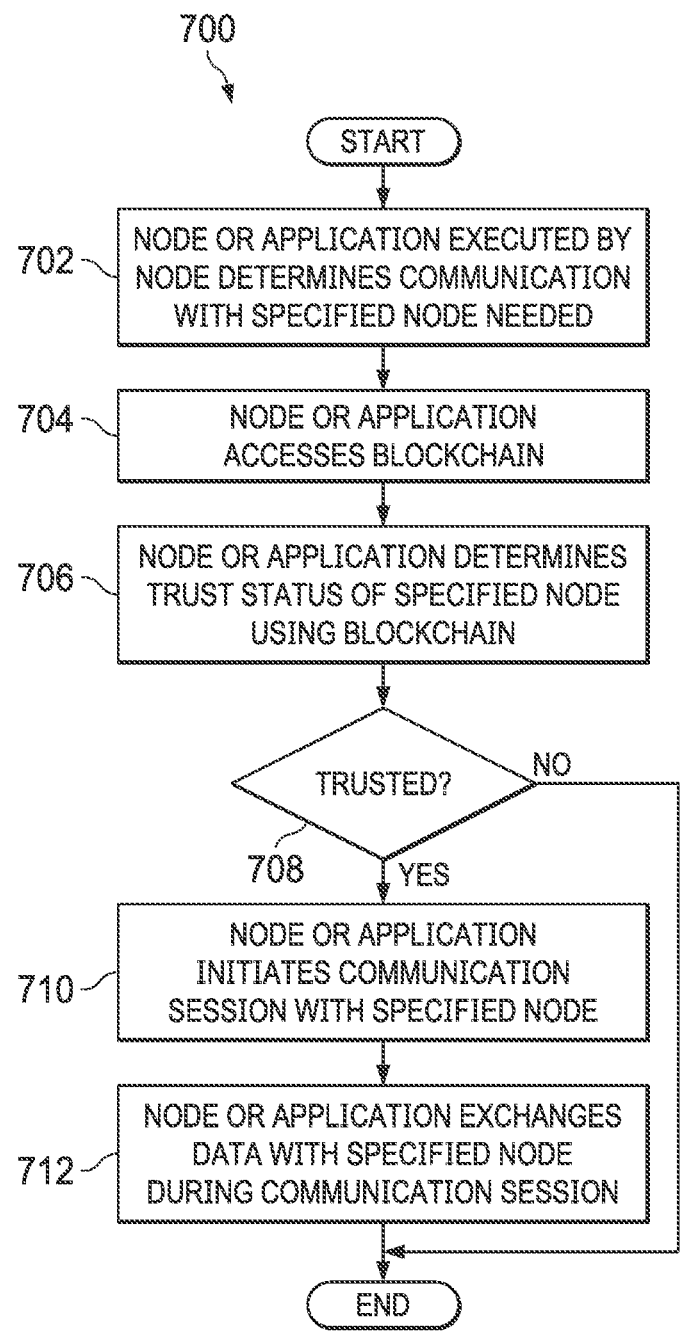
FIG. 7 illustrates an example method for using blockchains to identify whether trust has been established between nodes in industrial control systems or other systems according to this disclosure.

FIG. 7 illustrates an example method 700 for using blockchains to identify whether trust has been established between nodes in industrial control systems or other systems according to this disclosure. For ease of explanation, the method 700 of FIG. 7 is described as being performed by a device 400 operating as a node in the functional architecture 200 of FIG. 2. However, the method 700 could be performed by any suitable devices in any suitable system.

As shown in FIG. 7, a node or an application executed by a node determines that communication with a specified node is needed at step 702. This could include, for example, the processor 402 of the device 400 determining whether some form of communication is needed with the specified node. This communication could represent a desired scheduled communication, a communication needed to obtain data for an executing application, or any other communication with the specified node that is needed (for whatever purpose).

The node or the application accesses a blockchain at step 704 and determines a trust status of the specified node at step 706. This could include, for example, the processor 402 of the device 400 accessing a local blockchain 206 or interacting with another device that has access to the blockchain 206. This could also include the processor 402 of the device 400 analyzing the data in the blockchain 206 to determine whether any blocks 302 contain an approved (and un-revoked) smart contract with the specified node. As noted above, another device could also access the blockchain 206, analyze the data, and provide an indication of the results back to the processor 402. If there is a valid (approved and un-revoked) smart contract with the specified node, this indicates that a smart contract was previously approved involving the specified node, so the specified node is trusted.

If the specified node is trusted at step 708, the node or the application initiates a communication session with the specified node at step 710. This could include, for example, the processor 402 of the device 400 sending a request for a communication session to the specified node via the communications unit 406. The specified node could then use a process that is the same as or similar to the method 600 to determine whether the communication session is permitted. The processor 402 of the device 400 here could use the specified node's public key in the blockchain 206 to communicate with the specified node, at least initially, to verify that the device presenting itself as the specified node is legitimate. Assuming the specified node determines that the communication session is permitted, the node or application can communicate with the specified node and exchange data during a secure communication session at step 712. This could include, for example, the processors 402 of the nodes establishing the communication session using TLS or other suitable mechanism.

If the specified node is not trusted at step 708, the method 700 ends here. However, other operations could also occur if a determination is made that the specified node is not trusted. For example, the node or application could contact the specified node and request identifying information, generate a smart contract, and request approval of the smart contract. If approved, the desired communication could occur, and the copies of the blockchain 206 can be updated as described above.

Although FIG. 7 illustrates one example of a method 700 for using blockchains to identify whether trust has been established between nodes in industrial control systems or other systems, various changes may be made to FIG. 7. For example, while shown as a series of steps, various steps in FIG. 7 could overlap, occur in parallel, occur in a different order, or occur any number of times. As a particular example, a node could perform the method 700 multiple times with different specified nodes. In each instance, the node could allow a communication attempt based on a valid smart contract currently in a blockchain, allow a communication attempt based on a new smart contract that is approved, or reject a communication attempt based on a new smart contract that is rejected (and the same blockchain or different blockchains could be used in different instances).

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus for using blockchains to establish trust between nodes in an industrial control system comprising:
at least one processor and a memory storing a blockchain configured to:
determine whether the blockchain identifies a valid smart contract indicating that communication with a specified node is permitted;
in response to determining that the blockchain does identify the valid smart contract, establish a secure communication session with the specified node; and
in response to determining that the blockchain does not identify the valid smart contract:
generate a new smart contract associated with the specified node;
in response to user approval of the new smart contract, establish the secure communication session with the specified node, wherein the at least one processor is further configured to:
access a copy of the blockchain in the memory to determine whether the blockchain identifies the valid smart contract;
generate an update to the blockchain and updating the copy of the blockchain in the memory using the update, the update identifying the new smart contract; and
publish the updated blockchain to one or more nodes for updating one or more additional copies of the blockchain; and
in response to user rejection of the new smart contract, not establish the secure communication session with the specified node.

2. The apparatus of claim 1, wherein the at least one processor is further configured, in response to the user rejection of the new smart contract, to:
generate an update to the blockchain and update the copy of the blockchain using the update, the update identifying the rejection of the new smart contract; and
publish the update to one or more host nodes for updating one or more additional copies of the blockchain.

3. The apparatus of claim 1, wherein:
the at least one processor is further configured, in response to determining that the blockchain does not identify the valid smart contract, to request identifying information from the specified node and to receive the identifying information from the specified node;
the identifying information comprises a public cryptographic key of the specified node; and
the update to the blockchain comprises a hash of the public cryptographic key of the specified node.

4. The apparatus of claim 1, wherein the at least one processor is configured to determine whether the blockchain identifies the valid smart contract in response to receiving a request for communication from the specified node.

5. The apparatus of claim 1, wherein the at least one processor is configured to receive an indication whether the blockchain identifies the valid smart contract from another device that has access to the blockchain.

6. The apparatus of claim 1, wherein the at least one processor is further configured to:
generate a genesis block for the blockchain;
receive one or more requests to join and use the blockchain from one or more host nodes; and
provide one or more copies of the blockchain to the one or more host nodes.

7. A non-transitory computer readable medium containing instructions, for using blockchains to establish trust between nodes in industrial control systems, that when executed cause at least one processor using a memory storing a blockchain to:
determine whether the blockchain identifies a valid smart contract indicating that communication with a specified node is permitted;
in response to determining that the blockchain does identify the valid smart contract, establish a secure communication session with the specified node; and
in response to determining that the blockchain does not identify the valid smart contract:
generate a new smart contract associated with the specified node;
in response to user approval of the new smart contract, establish the secure communication session with the specified node, wherein the at least one processor is further configured to:

access a copy of the blockchain in the memory to determine whether the blockchain identifies the valid smart contract;
  generate an update to the blockchain and updating the copy of the blockchain in the memory using the update, the update identifying the new smart contract; and
  publish the updated blockchain to one or more nodes for updating one or more additional copies of the blockchain; and
  in response to user rejection of the new smart contract, not establish the secure communication session with the specified node.

8. The non-transitory computer readable medium of claim 7, further containing instructions that when executed cause the at least one processor, in response to the user rejection of the new smart contract, to:
  generate an update to the blockchain and update the copy of the blockchain using the update, the update identifying the rejection of the new smart contract; and
  publish the update to one or more host nodes for updating one or more additional copies of the blockchain.

9. The non-transitory computer readable medium of claim 7, further containing instructions that when executed cause the at least one processor, in response to determining that the blockchain does not identify the valid smart contract, to request identifying information from the specified node and to receive the identifying information from the specified node;
  wherein the identifying information comprises a public cryptographic key of the specified node;
  wherein the update to the blockchain comprises a hash of the public cryptographic key of the specified node.

10. The non-transitory computer readable medium of claim 7, further containing instructions that when executed cause the at least one processor to:
  generate a genesis block for the blockchain;
  receive one or more requests to join and use the blockchain from one or more host nodes; and
  provide one or more copies of the blockchain to the one or more host nodes.

11. A method for using blockchains to establish trust between nodes in industrial control systems comprising:
  determining, by at least one processor, whether a blockchain identifies a valid smart contract indicating that communication with a specified node is permitted;
  in response to determining that the blockchain does identify the valid smart contract, establishing a secure communication session with the specified node; and
  in response to determining that the blockchain does not identify the valid smart contract:
    generating a new smart contract associated with the specified node;
    in response to user approval of the new smart contract, establishing the secure communication session with the specified node, wherein in response to the user approval of the new smart contract:
      accessing a copy of the blockchain in a memory storing the blockchain to determine whether the blockchain identifies the valid smart contract,
      generating an update to the blockchain and updating the copy of the blockchain in the memory using the update, the update identifying the new smart contract; and
      publishing the update blockchain to one or more host nodes for updating one or more additional copies of the blockchain; and
    in response to user rejection of the new smart contract, not establishing the secure communication session with the specified node.

12. The method of claim 11, further comprising, in response to the user rejection of the new smart contract:
  generating an update to the blockchain and updating the copy of the blockchain using the update, the update identifying the rejection of the new smart contract; and
  publishing the update to one or more host nodes for updating one or more additional copies of the blockchain.

13. The method of claim 11, further comprising:
  in response to determining that the blockchain does not identify the valid smart contract, requesting identifying information from the specified node and receiving the identifying information from the specified node;
  wherein the identifying information comprises a public cryptographic key of the specified node;
  wherein the update to the blockchain comprises a hash of the public cryptographic key of the specified node.

14. The method of claim 11, wherein:
the blockchain does identify the valid smart contract;
the valid smart contract was generated by one of the specified node and a second node; and
the secure communication session is established between the specified node and a third node.

* * * * *